Oct. 13, 1942.    V. I. DUDLEY    2,298,472
CONVEYER LOADING DEVICE
Filed May 8, 1941    3 Sheets-Sheet 1

INVENTOR.
Victor I. Dudley
BY
ATTORNEY

Oct. 13, 1942.  V. I. DUDLEY  2,298,472
CONVEYER LOADING DEVICE
Filed May 8, 1941   3 Sheets-Sheet 2

INVENTOR.
Victor I. Dudley
BY Harold W. Hawkins
ATTORNEY

Oct. 13, 1942.     V. I. DUDLEY     2,298,472
CONVEYER LOADING DEVICE
Filed May 8, 1941     3 Sheets-Sheet 3
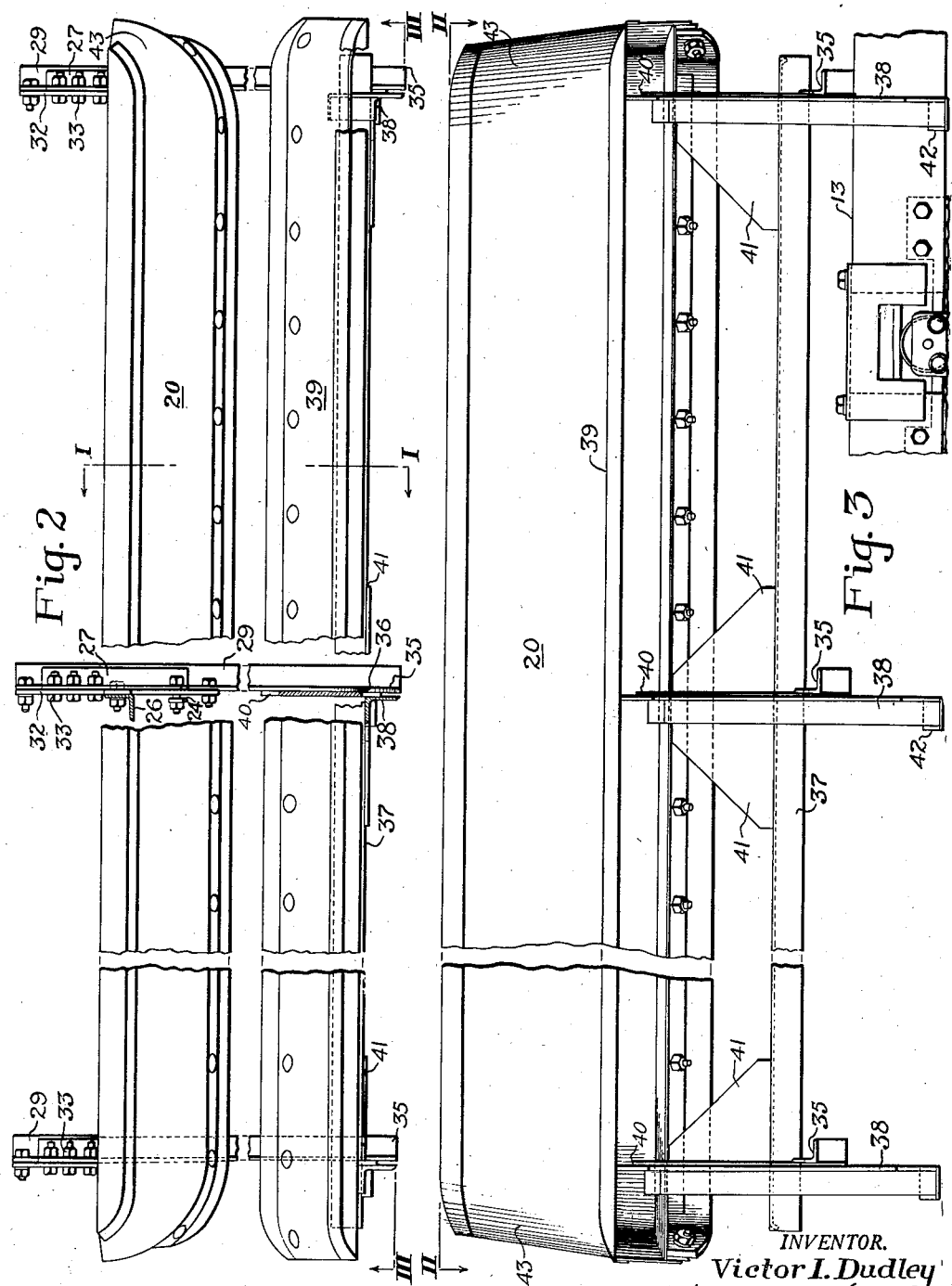
INVENTOR.
Victor I. Dudley
BY Harold W. Hawkins
ATTORNEY Patented Oct. 13, 1942

2,298,472

UNITED STATES PATENT OFFICE 2,298,472

CONVEYER LOADING DEVICE

Victor I. Dudley, Franklin, Pa., assignor to Joy Manufacturing Company, a corporation of Pennsylvania Application May 8, 1941, Serial No. 392,458

9 Claims. (Cl. 198—204)

This invention relates to conveyers and more particularly to improvements in a loading device for a belt conveyer of the type used to transport loose bulk material such as coal.

Belt conveyers are now being extensively used in underground coal mines to transport or convey coal produced in a given section of the mine to the main haulage road or entry.

At the present time coal mining in this country is generally carried on in what is known as the "room and pillar system," or variations thereof. Briefly, in this system of mining the coal seam is laid out in blocks or sections. A haulage entry is driven through the section and the rooms or working places are turned off at regular intervals along each side of the entry.

When conveyers are used to transport the coal produced in a section, the belt is laid in the entry and the coal produced in the rooms or working places, on each side thereof, is loaded onto the belt at the room neck or place where the rooms or working places turn off from the entry.

The principal object of this invention is to provide a loading device for a belt conveyer which can be readily installed at any desired point along the length of the belt conveyer, and can be readily and quickly removed and transported to another loading station at any desired point along the length of the belt.

Another object of this invention is to provide a loading device for a belt conveyer which is simple in construction, economical to manufacture, easy to install and dismantle, and which permits the belt to be loaded at any desired point along its length.

These and other objects which will hereinafter be made apparent to those skilled in this particular art, are accomplished by means of this invention, one embodiment of which is described in the following specification and illustrated in the accompanying drawings, wherein:

Fig. 2 is a top plan view of the loading device shown in Fig. 1;

Fig. 3 is a view in elevation of the left side of the loading device as viewed in Fig. 1;

Figure 6:
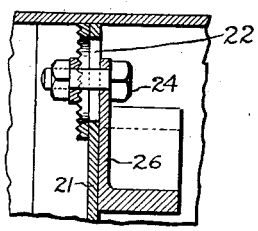
Fig. 6 is a sectional view taken on line VI—VI of Fig. 1.
Figure 1:
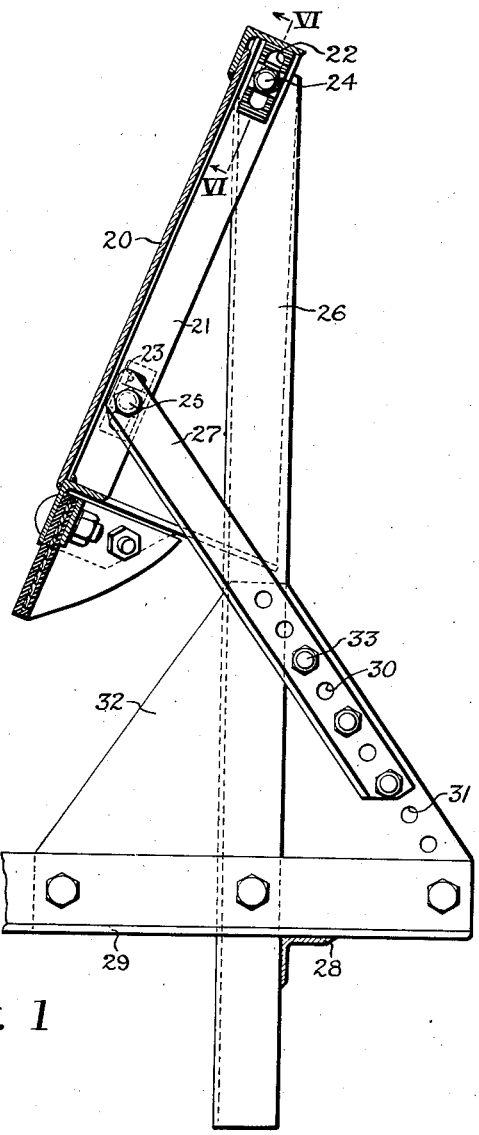
Fig. 1 is an enlarged sectional view of a loading device made in accordance with my invention.
Figure 1A:
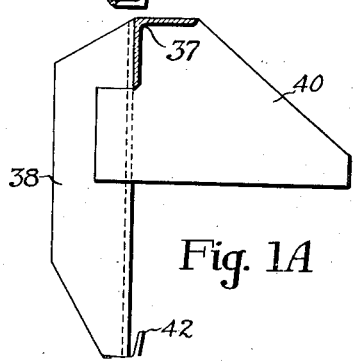
Fig. 1A is a side view of a modified form of spill board or anchoring section for the loading device.
Figure 4:
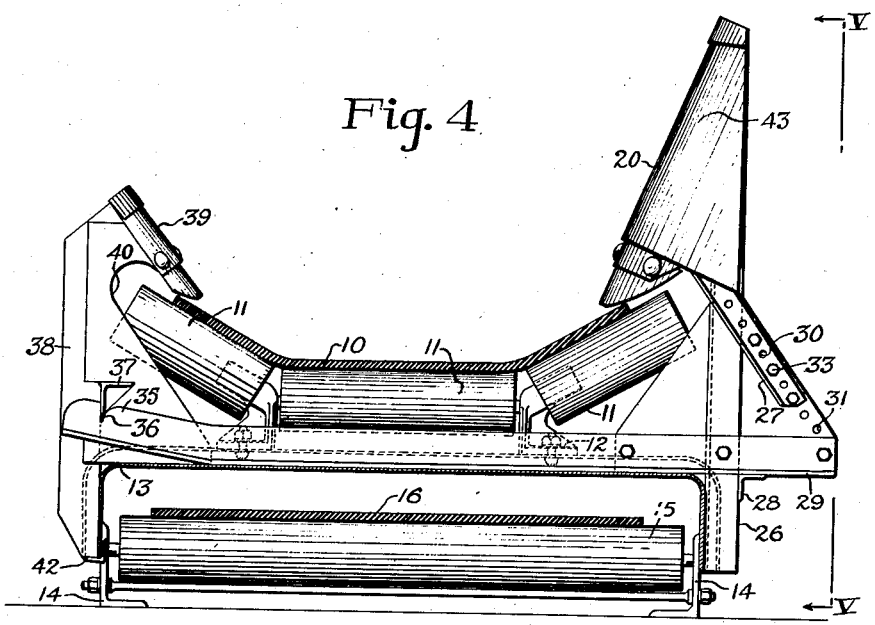
Fig. 4 is an end view of my loading device showing its relation to a belt conveyer when installed thereon.
Figure 5:
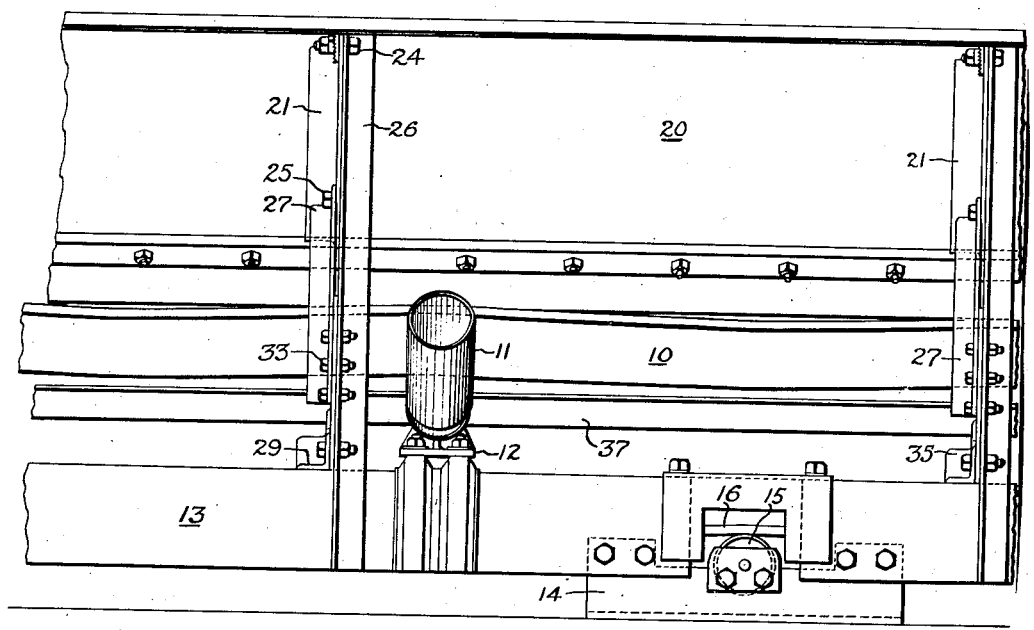
Fig. 5 is a partial view in side elevation of a belt conveyer equipped with a loading device made in accordance with my invention.

Referring in detail to the drawings, and particularly to Fig. 4 thereof, 10 represents the active reach of a belt conveyer which is supported at intervals along its length on a series of rollers 11 disposed angularly to each other so that the active reach of the belt is substantially in the form of a trough. The rollers 11 are carried by a bracket 12 bolted to the top surface of an inverted troughing 13 of substantially channel shape in section. As illustrated, the troughing 13 is made up of sections having their adjacent ends bolted to angles 14 which support the troughing on the surface over which the belt is adapted to travel in such a way that the bottom edges of the troughing are spaced above that surface. The angles 14 also carry rollers 15 for supporting the return reach 16 of the belt within the troughing 13.

In order to load the belt 10 at any desired point along the length thereof, a loading device made in accordance with my invention is provided, which consists of a baffle 20 mounted on a series of members 21 having elongated slots 22—23 therein for receiving bolts 24—25, which secure each of the members 21 to an upright member 26 and to an angularly disposed member 27. The upright members 26 are tied together by a longitudinally extending member 28, and each has a horizontally extending member 29 secured thereto and to the tie member 28. The tie member 28 is spaced somewhat above the lower ends of the members 26 to provide a downwardly projecting leg, the purpose of which will be hereinafter explained.

The opposite ends of member 27 is provided with a plurality of openings 30 which are adapted to register any of several openings 31 in a plate 32 secured to each of the upright members 26, and to the horizontal member 29, and to which the member 27 is removably secured by bolts 33. The members 21—26—27—28—29 form a frame for supporting the baffle 20.

From this construction of the frame it is apparent that by loosening the bolts 24—25, the baffle 20 may be raised or lowered through the distance of the slots 22—23, and by moving other of the openings 30 into registration with other of the openings 31 in the plate 32, the angularity of the baffle can likewise be readily varied.

The outer ends of the members 29 are flared or bent upwardly and are provided with a notch 36 for receiving a longitudinally extending member 37 which ties together a series of upright members 38, which support and carry a spill board 39. Each of the uprights 38 carries a plate 40, the lower edge of which lies, when the device is assembled, in the same plane as the bottom of the member 29. Webs 41 are disposed between the members 37 and the uprights 38 to reinforce and strengthen the structure and to prevent turning of the members 38 relative to the horizontal member 37. The member 37 is spaced above the bottom of the members 38 and one leg of a small angle 42 is secured to the bottom of each of the members 38 in such a way that the other leg thereof is spaced from and projects upwardly and outwardly along the inner face of the member 38. The members 37—38—39 and angles 42 form a unit for securing the baffle 20 in position on the conveyor troughing as will hereinafter appear.

In assembling my improved loading device on a belt conveyer, the spill board 39 is placed along the side of the belt where loading is desired and the angles or clips 42 are hooked under the bottom of the troughing 13 after which the spill board is turned to a substantially vertical position with the members 40 resting on top of the troughing 13. When the spill board 39 has been so placed, the baffle 20, together with its supporting structure is moved to the opposite side of the conveyer and the ends of the members 29 are inserted between the belt 10 and the top of the troughing 13. The entire structure is then moved transversely of the troughing until the ends 35 of the members 29 pass beneath the member 37 and the lower ends or legs of uprights 26 engage the sides of the troughing 10. The baffle 20, and its supporting structure, is then allowed to settle downwardly against the top of the troughing 13 until the members 29 rest upon the top of the troughing, which moves the notches 36 into engagement with the member 37 and prevents sidewise movement of the spill board 39 and locks the device securely in place on the troughing.

The ends of the baffle 20 are curved or bent away from the belt as at 43, so that when in place it will deflect any material traveling along the belt toward the center thereof and thus not only prevent material on the belt from being dislodged but also will permit several loading devices to be used on a single belt.

From this construction it is apparent that the loading device is securely locked to the troughing and will not be dislodged by coal striking either the baffle 20 or the spill board 39.

To remove the loading device the operation above described is reversed, after which the baffle 20, and its supporting structure, and the spill board 39, and its supporting structure, are moved to any desired location.

While one illustrative embodiment of my invention has been described, it is not my intention to limit the scope of the invention to any particular embodiment or otherwise than by the terms of the appended claims.

What I claim is:

1. A loading device for a belt conveyer having an inverted troughing carrying the rollers for supporting said belt, comprising a baffle extending lengthwise of and having an edge overlapping said belt along one side thereof, a frame for supporting said baffle on said troughing, and means on the opposite side of said belt from said baffle for clamping said frame to said troughing.

2. A loading device for a belt conveyer having an inverted troughing carrying the rollers for the upper and bottom reaches of a belt, comprising a baffle extending lengthwise of and above said belt on one side thereof, a frame for supporting said baffle having a series of horizontal members resting on said troughing, and means adapted to be hooked onto said troughing and to fit over the ends of said horizontal members for securing said frame in position on said troughing.

3. A loading device for a belt conveyer having an inverted troughing carrying the rollers for supporting the active and return reaches of a belt, comprising a baffle extending lengthwise along one side of said belt and disposed thereabove, with its lower edge overlapping the edge of said belt, means adapted to rest on said troughing for supporting said baffle, and a spill board extending lengthwise along the opposite side of said belt and supported on said baffle supporting means, and means on said spill board for securing the same to said troughing.

4. A loading device for a belt conveyer having an inverted troughing carrying the rollers for supporting the active and return reaches of said belt, comprising a pair of spill members extending lengthwise of said belt on opposite sides thereof, and disposed thereabove with their lower edges overlapping the edges of said belt, an independent supporting frame for each of said spill members, one of said frames being adapted to engage and be supported by the other of said frames, and means on said supported frame adapted to engage said troughing to lock said device thereto.

5. A loading device for a belt conveyer having an inverted troughing carrying the rollers for supporting the active and return reaches of said belt, comprising a pair of spill members extending lengthwise of said belt on opposite sides thereof, and disposed thereabove with their lower edges overlapping the edges of said belt, an L-frame supporting one of said spill members and adapted to rest on the troughing for said belt, supporting means for the other of said spill members adapted to rest on said troughing and engage said L-frame and means for connecting said supporting means to said troughing.

6. A loading device for a belt conveyer having inverted troughing carrying the rollers for supporting the active and return reaches of said belt, comprising a baffle extending lengthwise of said belt along one side thereof, a frame on which said baffle is mounted having a series of members adapted to extend transversely of and rest on the troughing of said conveyer, the outer ends of said members being flared upwardly and having a slot therein and means for locking said baffle and its supporting frame to said troughing, including a spill board extending lengthwise along the opposite side of said belt, a frame supporting said spill member having a member adapted to be received in said slots, and means on said frame adapted to hook under the depending edge of said troughing.

7. A loading device for a belt conveyer having inverted troughing carrying the rollers for supporting the active and return reaches of said belt, comprising a baffle extending lengthwise of said belt along one side thereof, a frame on which said baffle is mounted having a series of members adapted to extend transversely of and rest on the troughing of said conveyer, the outer ends of said members being flared upwardly and having a slot therein, a spill board along the opposite side of said belt, a supporting frame for said spill board having a tie bar adapted to be positioned in the slots of said members, and hooks carried by said last mentioned frame adapted to engage the depending edge of said troughing to hold said device in place on said troughing.

8. A loading device for a belt conveyer having inverted troughing carrying the rollers for supporting the active and return reaches of said belt, comprising a baffle adapted to extend lengthwise of a belt at an angle thereto with its lower edge overlapping the edge of said belt, a supporting frame for said baffle having horizontal members adapted to rest on said troughing, and a tie bar hooked onto the depending edge of said troughing and engaging the upper surfaces of said horizontal members for clamping said frame to said troughing.

9. A loading device for a belt conveyer having an inverted troughing carrying the rollers for supporting said belt, comprising a baffle extending lengthwise of and having an edge overlapping said belt along one side thereof, a frame for supporting said baffle and resting on said troughing and means for clamping said frame to said troughing.

VICTOR I. DUDLEY.